Oct. 7, 1947.    H. A. ROSE    2,428,586
VAPOR-ELECTRIC DEVICE
Filed July 20, 1943    2 Sheets—Sheet 2

WITNESSES:
Alice P. Howell
Mr. C. Groove

INVENTOR
Herbert A. Rose.
BY
S. A. Strickled
ATTORNEY

Patented Oct. 7, 1947

2,428,586

UNITED STATES PATENT OFFICE 2,428,586

VAPOR-ELECTRIC DEVICE

Herbert A. Rose, Pittsburgh, Pa., assignor to Westinghouse Electric Corporation, East Pittsburgh, Pa., a corporation of Pennsylvania Application July 20, 1943, Serial No. 495,404

9 Claims. (Cl. 175—363)

My invention relates to vapor electric devices and particularly to a connection for reducing the light-load voltage rise in a multiplied phase converter.

In the operation of vapor electric devices it is desirable to utilize multiplied phase operation such as the so-called double three-phase system in order to increase the utilization factor of the transformer.

In conversion systems operating with multiplied phase arrangements there is a disadvantage in that at low load the excitation current of the interphase transformer, which maintains the multiplied phase operation, will be insufficient to produce sufficient voltage to maintain the mode of operation, resulting in an increase of terminal voltage at light load. Many systems have been heretofore proposed for eliminating the so-called light-load voltage rise. The most generally used of these systems has been the provision of a dummy load for maintaining the load current of the converter above the point where loss of excitation of the interphase windings sets in.

The interphase transformer draws its exciting current from the D. C. load. These harmonics are at triplicate frequency with respect to the supply frequency.

In the system according to my invention, I provide means to circulate the normal harmonics usually generated in the main transformer itself through the interphase winding to produce excitation thereof at the time when the load current is insufficient to produce such excitation. The harmonic current path is most easily provided by means of capacitors shunted across the terminals of the sections of the main transformer. As the triplicate harmonics (the third harmonics and its multiples) are substantially in phase these shunting paths produce a circuit in which the triplicate harmonics will flow to excite the interphase windings. To obtain these currents and voltages from the main transformer, it is necessary that the main transformer not have polygon windings in its connections.

Accordingly, an object of my invention is to provide a system for reducing the light-load voltage rise in a vapor electric conversion system.

It is a further object of my invention to provide paths for permitting circulation of the harmonics in the transformer of a conversion system.

It is a further object of my invention to provide capacity means for circulating an exciting current in the interphase windings of a converter transformer.

It is a further object of my invention to utilize the main transformer as a source of excitation potential for the interphase transformer.

Other objects and advantages of my invention will be apparent from the following detailed description taken in conjunction with the accompanying drawing, in which.

Figure 1:
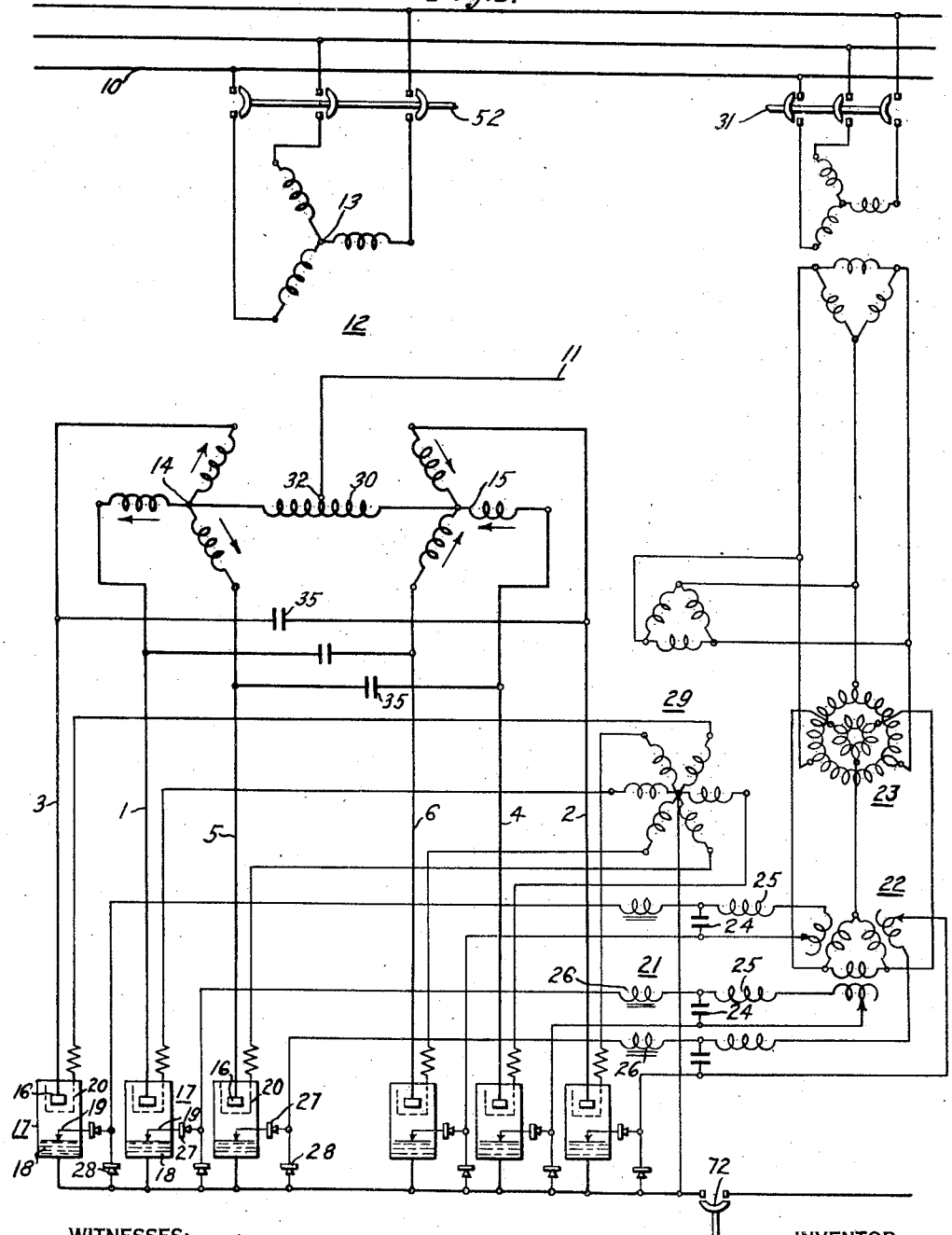
Figure 1 is a schematic illustration of a vapor electric device embodying my invention.

In the illustrative embodiment of my invention, according to Figure 1, a polyphase alternating-current circuit 10 is connected to a direct-current circuit 11 by means of a rectifier transformer 12. The connection of the transformer 12 to the alternating-current circuit 10 is controlled by means of a circuit breaker 52 and the connection to the direct-current circuit 11 is controlled by means of a circuit breaker 72. The transformer 12 is provided with a star-connected winding 13 connected to the polyphase circuit 10 and a plurality of star-connected secondary windings 14 and 15 herein shown as two in number. The terminals of these star-connected windings are connected to the anodes 16 of the converter valves 17 by terminal connections 1 to 6.

The plurality of star-connected windings 14 and 15, the terminals of which are connected to the vapor electric valves 17, are interconnected by means of a winding 30 usually called an interphase transformer. An intermediate tap 32 of the interphase winding 20 provides one of the connections for the direct-current circuit 11 while the other side of the direct-current circuit 11 is made to the cathode 18 of the eletcric valves 17.

While any suitable electric valve 17 may be utilized, I prefer to use valves 17 of the so-called make-alive type in which each valve comprises a main anode 16, a main cathode 18, an excitation electrode 19 in contact with the cathode 18 and a shield about the anode 16. Each valve 17 is periodically excited by means of an impulsing circuit 21 from any suitable source of alternating-current herein illustrated as a transformer 22 connected to the alternating-current circuit 10 by means of a circuit breaker 31. If it is desired, a phase shifting device such as an induction phase shifter 23 may be inserted between the source and the impulsing system 21. I prefer to use an impulsing system comprising a capacitor 24 charged from the alternating-current source 22, through an impedance 25 and discharging to the make-alive electrodes 19, through a non-linear impedance such as a saturable reactor 26.

Each impulsing device 21 can be made to excite two alternately conducting valves 17 by means of a polarity selective network comprising a unidirectional conductor 27 in series with the exciting electrode 19 and a second unidirectional conductor 28 in shunt with the exciting electrode 19 and the first-mentioned unidirectional conductor 27.

In order to insure pick-up of the main current to the anodes 16 of the valves 17, it is customary to provide shield excitation and I have shown such excitation as supplied by an auxiliary exciting transformer 29 having a neutral connection to the cathodes 18 of the valves 17 and various terminals connected to the corresponding anode shields 20.

In the normal operation of a rectifier transformer, harmonics, such as the third and the multiples thereof, are usually generated in the windings of the transformer and means such as a delta winding, have usually been provided for eliminating the effects of such harmonics from the circuit.

In the construction according to my invention, these harmonics, instead of being eliminated, are utilized to secure excitation of the interphase winding 30 at a time when the load current of the converter does not provide sufficient exciting current for the interphase winding 30.

As shown in Fig. 1, the useful harmonic voltages of each of the star-connected windings 14 and 15 will at the same instant all be in phase and of equal magnitude. For example, at the same instant, all of the harmonic voltages will be positive in the direction from the neutral to the terminals of one of the star-connected windings such as 14 and will be positive from the terminals to the neutral of the star-connected windings 15.

Accordingly, if capacitors 35 are connected to provide a path between the terminals of one of the star-connected windings and the terminals of the other star-connected windings, the harmonic current will pass through the connection and return through the interphase winding. In order to reduce the normal or fundamental voltage from this path I prefer to connect the terminal of one winding 14, such as terminal 1, to a terminal of another winding 15 in which the main potential is at a minimum, such as terminal 6. Likewise, terminal 3 would be connected to terminal 2 and terminal 5 to terminal 4.

In this manner the full harmonic potential generated in both of the star-connected windings 14 and 15 will find a path through the interphase winding 30 and will tend to excite this winding to produce the necessary voltage between the star points of the two windings 14 and 15 to maintain the multiplied phase mode of operation in the region of light load.

In order to secure the desired amount of excitation, the impedance of the shunting paths should be small compared to the impedance of the interphase winding plus the series parallel windings of the main transformer. The necessary relations are given by the following equation:

$$e_h = [x_c + x_1 + x_a] I_h$$

where $e_h$ = triplen harmonic voltage generated by the main transformer.
$x_c$ = impedance of the capacitors.
$x_1$ = inductive impedance at the interphase winding.
$x_a$ = inductive impedance at the series-parallel windings at the main transformer to flow at the triplen frequency currents.
$x_c$ should be small compared to $x_1 + x_a$.

$$x_c = \frac{1}{3(2\pi f c)}$$

$x_1 = 2\pi f L$
$x_a = 2\pi f_a$
$I_h$ = triplen harmonic current flowing in the interphase winding.

The third harmonic voltage and its multiples will maintain the current rending to excite the interphase transformer 30 for light load operation of the converter.

Figure 2:
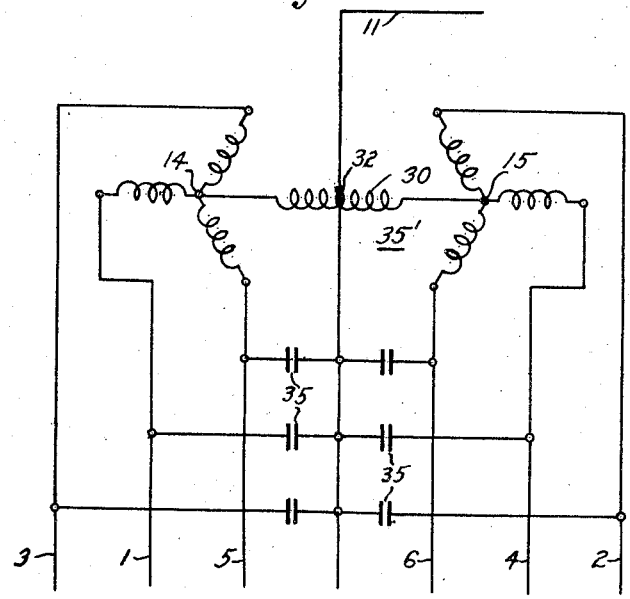
Fig. 2 is a similar view of the transformer connections shown in a modification according to my invention.

Instead of directly connecting the harmonic paths 35 between the main phase terminals the effect of the main transformer fundamental voltage may be further reduced by providing a circuit 35' from each phase terminal 1 to 6 to a midpoint 32 of the interphase transformer 30, as shown in Fig. 2. Each of the third harmonic voltages, as generated by the windings 14 and 15 will then flow in only half of the interphase transformer 30 but as the impedance is thereby reduced the current will be increased and the effective excitation will remain substantially constant.

Figure 3:
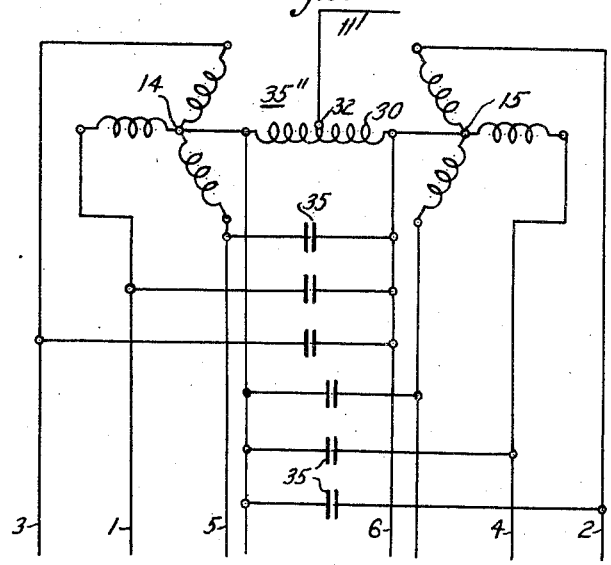
Fig. 3 is a similar view showing further modification of my invention.

The same effect may be secured as shown in Fig. 3 by connecting a path 35'' from each phase terminal 1 across the entire interphase transformer 30. Each of the third harmonic currents will produce its increment of excitation in the entire interphase transformer 30.

For purposes of illustration I have shown and described specific embodiments of my invention. It will be apparent that changes and modifications can be made therein without departing from the true spirit of my invention or the scope of the appended claims.

I claim as my invention:

1. An electric conversion system interconnecting a pair of electric circuits, at least one of which is a polyphase alternating current circuit, comprising a transformer means including a polyphase star-connected winding connected to the polyphase circuit, a plurality of star-connected windings electrically insulated from said first-mentioned winding, electrical valves connected to said plurality of star-connected windings, interphase transformer means interconnecting said plurality of star-connected windings and capacitor means interconnecting the outer terminals of said star-connected windings for circulating the harmonic currents of said plurality of windings through said interphase transformer means.

2. An electric conversion system interconnecting a pair of electric circuits at least one of which is a polyphase alternating current circuit comprising a transformer means including a polyphase star-connected winding connected to the polyphase circuit, a plurality of star-connected windings electrically insulated from said first-mentioned winding, electrical valves connected to said plurality of star-connected windings, interphase transformer means interconnecting said plurality of star-connected windings and capacitor means for utilizing the voltages of said plurality of windings to circulate a harmonic exciting current in said interphase transformer means.

3. A vapor-electric conversion system comprising a converter transformer, said transformer including a plurality of star-connected windings, electric valve means connected to the terminals of said star-connected windings, interphase winding means interconnecting said star-connected windings, and capacitor means connected from each terminal of said star-connected windings to a terminal of said interphase winding remote from the particular star-connected winding.

4. A vapor-electric conversion system comprising a converter transformer, said transformer including a plurality of star-connected windings, electric valve means connected to the terminals of said star-connected windings, interphase winding means interconnecting said star-connected windings, a mid-tap in said interphase winding means and a capacitor connected from each terminal of said star-connected windings to said mid-tap.

5. A vapor-electric conversion system for transferring electric energy between two dissimilar electric circuits one of which is a polyphase alternating current circuit comprising a plurality of vapor-electric valves for controlling the flow of current between said circuits, transformer means interconnecting said circuits, said transformer means including a star-connected winding connected to said polyphase circuit, a plurality of groups of star-connected windings, terminal connections from said groups of windings to said valves, interphase winding means interconnecting said groups of windings for controlling the mode of operation of the system and capacitor means connected between the outer terminal connections of alternate groups of windings.

6. A vapor-electric conversion system for transferring electric energy between two dissimilar electric circuits one of which is a polyphase alternating current circuit comprising a plurality of vapor-electric valves for controlling the flow of current between said circuits, transformer means interconnecting said circuits, said transformer means including a star-connected winding connected to said polyphase circuit, a plurality of groups of star-connected windings, terminal connections from said groups of windings to said valves, interphase winding means interconnecting said groups of windings for controlling the mode of operation of the system and capacitor means connected from each outer terminal connection of said groups of windings across the winding means interconnecting said groups of windings.

7. In a converter system having a multiplied phase mode of operation, a transformer having a plurality of star-connected windings, an interphase transformer introducing a voltage between said star-connected windings for producing said multiplied phase mode of operation and capacitor means connected to the output terminals of the star-connected windings for supplying exciting current to said interphase transformer at low loads on said system.

8. In valve-type conversion systems, a transformer having a plurality of star-connected windings, electric valve means connected to the outer terminals of said star-connected windings, an interphase transformer connected between said star-connected windings for controlling the mode of operation of said conversion system and capacitors connected to the outer terminals of said star-connected windings and across said interphase transformer for circulating exciting current in said interphase transformer.

9. In an electric transformer system, a plurality of star-connected windings, an interphase transformer interconnecting said star-connected windings for controlling the mode of operation thereof, capacitors energized from the outer terminals of said star-connected winding system and connected across said interphase transformer for supplying exciting current thereto.

HERBERT A. ROSE.

REFERENCES CITED

The following references are of record in the file of this patent:

UNITED STATES PATENTS

| Number | Name | Date |
| --- | --- | --- |
| 1,957,229 | Sabbah | May 1, 1934 |
| 1,876,428 | Lennox | Sept. 6, 1932 |
| 1,976,580 | Rose | Oct. 9, 1934 |

FOREIGN PATENTS

| Number | Country | Date |
| --- | --- | --- |
| 576,033 | France | May 5, 1924 |
| 339,531 | Italy | Apr. 23, 1936 |